United States Patent [19]
Ng

[11] Patent Number: 5,359,431
[45] Date of Patent: Oct. 25, 1994

[54] CLASSIFICATION TO CHANGE EXPOSURE WITHIN A CELL OF DIFFERENT PIXELS

[75] Inventor: Yee S. Ng, Fairport, N.Y.
[73] Assignee: Eastman Kodak Company, Rochester, N.Y.
[21] Appl. No.: 894,858
[22] Filed: Jun. 5, 1992
[51] Int. Cl.$^5$ .............................................. H04N 1/40
[52] U.S. Cl. ................................... 358/457; 358/458; 358/459; 358/465
[58] Field of Search ............... 358/459, 458, 456, 457, 358/455, 465, 466, 298; 395/109

[56] References Cited

U.S. PATENT DOCUMENTS

4,547,812 10/1985 Waller et al. ...................... 358/459
5,081,528 1/1992 Hayashi et al. ...................... 358/456

Primary Examiner—Edward L. Coles, Sr.
Assistant Examiner—Scott A. Rogers
Attorney, Agent, or Firm—Norman Rushefsky

[57] ABSTRACT

A method and arrangement for reproducing an original image, scans an original image to produce a digitized image, this digitized image containing a plurality of pixels. The pixels are grouped into cells, and the pixels in each cell are classified into one of at least two classes. An exposure level for printing these pixels is modified according to this classification. The pixels are printed according to the modified exposure levels to reproduce the original image with even halftone lightness jumps.

11 Claims, 10 Drawing Sheets

```
         30
            LEVEL 1                            LEVEL 5
        43  36  22   8                 47   40   26   12
        15  ①   29  50                 19    5   33   54
        22  [8] 43  36                 26   12   47   40
        29  50  15   1                 33   54   19    5

LEVEL 2                            LEVEL 6
        44  37  23   9                 48   41   27   13
        16   2  30  51                 20    6   34   55
        23   9  44  37                 27   13   48   41
        30  51  16   2                 34   55   20    6

LEVEL 3                            LEVEL 7
        45  38  24  10                 49   42   28   14
        17   3  31  52                 21    7   35   56
        24  10  45  38                 28   14   49   42
        31  52  17   3                 35   56   21    7

LEVEL 4
        46  39  25  11
        18   4  32  53
        25  11  46  39                 •  •  •  •  •  •  •
        32  53  18   4                 1  2  3  4  5  6  7
```

```
         34┐
             LEVEL 1                    LEVEL 5
        ┌──┬──┐
      7 │ 6│ 4│  2            39    38    36    34
     ┌──┤  ├──┘
     │ 3│ ①│ 5   8            35    33    37    40
     │  ├──┤
     │ 4│ 2│ 7   6            36    34    39    38
     └──┤  ├──┐
      5 │ 8│ 3│  1            37    40    35    33
        └──┴──┘

LEVEL 2                    LEVEL 6
        ┌──┬──┐
     15 │14│12│ 10            47    46    44    42
     ┌──┼──┼──┤
     │11││ 9││13│ 16          43    41    45    48
     ├──┼──┼──┤
     │12││10│ 15  14          44    42    47    46
     └──┼──┤
     13 │16│11   9             45    48    43    41
        └──┴──┘

LEVEL 3                    LEVEL 7
     23    22    20    18      55    54    52    50
     19    17    21    24      51    49    53    56
     20    18    23    22      52    50    55    54
     21    24    19    17      53    56    51    49

LEVEL 4
     31    30    28    26
     27    25    29    32
     28    26    31    30
     29    32    27    25
```

FIG. 6

LEVEL 1
| 31 | 26 | 16 | 6 |
|---|---|---|---|
| 11 | ① | 21 | 36 |
| 16 | [6] | 31 | 26 |
| 21 | 36 | 11 | 1 |

LEVEL 2
| 32 | 27 | 17 | 7 |
|---|---|---|---|
| 12 | 2 | 22 | 37 |
| 17 | 7 | 32 | 27 |
| 22 | 37 | 12 | 2 |

LEVEL 3
| 33 | 28 | 18 | 8 |
|---|---|---|---|
| 13 | 3 | 23 | 38 |
| 18 | 8 | 33 | 28 |
| 23 | 38 | 13 | 3 |

LEVEL 4
| 34 | 29 | 19 | 9 |
|---|---|---|---|
| 14 | 4 | 24 | 39 |
| 19 | 9 | 34 | 29 |
| 24 | 39 | 14 | 4 |

LEVEL 5
| 35 | 30 | 20 | 10 |
|---|---|---|---|
| 15 | 5 | 25 | 40 |
| 20 | 10 | 35 | 30 |
| 25 | 40 | 15 | 5 |

LEVEL 6
| 47 | 46 | 44 | 42 |
|---|---|---|---|
| 43 | 41 | 45 | 48 |
| 44 | 42 | 47 | 46 |
| 45 | 48 | 43 | 41 |

LEVEL 7
| 55 | 54 | 52 | 50 |
|---|---|---|---|
| 51 | 49 | 53 | 56 |
| 52 | 50 | 55 | 54 |
| 53 | 56 | 51 | 49 |

FIG. 7

| THRESHOLD LEVEL 1 | | | | THRESHOLD LEVEL 6 | | | | THRESHOLD LEVEL 11 | | | |
|---|---|---|---|---|---|---|---|---|---|---|---|
| 56 | 67 | 34 | 12 | 61 | 72 | 39 | 17 | 66 | 77 | 44 | 22 |
| 23 | 1 | 45 | 78 | 28 | 6 | 50 | 83 | 33 | 11 | 55 | 88 |
| 34 | 12 | 56 | 67 | 39 | 17 | 61 | 72 | 44 | 22 | 66 | 77 |
| 45 | 78 | 23 | 1 | 50 | 83 | 28 | 6 | 55 | 88 | 33 | 11 |

| THRESHOLD LEVEL 2 | | | | THRESHOLD LEVEL 7 | | | | THRESHOLD LEVEL 12 | | | |
|---|---|---|---|---|---|---|---|---|---|---|---|
| 57 | 68 | 35 | 13 | 62 | 73 | 40 | 18 | 94 | 95 | 92 | 90 |
| 24 | 2 | 46 | 79 | 29 | 7 | 51 | 84 | 91 | 89 | 93 | 96 |
| 35 | 13 | 57 | 68 | 40 | 18 | 62 | 73 | 92 | 90 | 94 | 95 |
| 46 | 79 | 24 | 2 | 51 | 84 | 29 | 7 | 93 | 96 | 91 | 89 |

| THRESHOLD LEVEL 3 | | | | THRESHOLD LEVEL 8 | | | | THRESHOLD LEVEL 13 | | | |
|---|---|---|---|---|---|---|---|---|---|---|---|
| 58 | 69 | 36 | 14 | 63 | 74 | 41 | 19 | 102 | 103 | 100 | 98 |
| 25 | 3 | 47 | 80 | 30 | 8 | 52 | 85 | 99 | 97 | 101 | 104 |
| 36 | 14 | 58 | 69 | 41 | 19 | 63 | 74 | 100 | 98 | 102 | 103 |
| 47 | 80 | 25 | 3 | 52 | 85 | 30 | 8 | 101 | 104 | 99 | 97 |

| THRESHOLD LEVEL 4 | | | | THRESHOLD LEVEL 9 | | | | THRESHOLD LEVEL 14 | | | |
|---|---|---|---|---|---|---|---|---|---|---|---|
| 59 | 70 | 37 | 15 | 64 | 75 | 42 | 20 | 110 | 111 | 108 | 106 |
| 26 | 4 | 48 | 81 | 31 | 9 | 53 | 86 | 107 | 105 | 109 | 112 |
| 37 | 15 | 59 | 70 | 42 | 20 | 64 | 75 | 108 | 106 | 110 | 111 |
| 48 | 81 | 26 | 4 | 53 | 86 | 31 | 9 | 109 | 112 | 107 | 105 |

| THRESHOLD LEVEL 5 | | | | THRESHOLD LEVEL 10 | | | | THRESHOLD LEVEL 15 | | | |
|---|---|---|---|---|---|---|---|---|---|---|---|
| 60 | 71 | 38 | 16 | 65 | 76 | 43 | 21 | 118 | 119 | 116 | 114 |
| 27 | 5 | 49 | 82 | 32 | 10 | 54 | 87 | 115 | 113 | 117 | 120 |
| 38 | 16 | 60 | 71 | 43 | 21 | 65 | 76 | 116 | 114 | 118 | 119 |
| 49 | 82 | 27 | 5 | 54 | 87 | 32 | 10 | 117 | 120 | 115 | 113 |

CLASSIFICATION TO CHANGE EXPOSURE WITHIN A CELL OF DIFFERENT PIXELS

This invention is related to the following applications, filed on even date with the present application: Ser. No. 07/894,857, for Halftone Dot Arrangement in Gray Level Halftone Printing; Ser. No. 07/894,859 for A Method and Arrangement For Providing a Default Mode in Digital Copying; Ser. No. 07/895,555 and now U.S. Pat. No. 5,200,831, for A Method and Arrangement For Locally Switching Gray Dot Types to Reproduce an Image With Gray Level Printing; Ser. No. 07/895,986, and now U.S. Pat. No. 5,239,390, for An Image Processing Method to Remove Halftone Screens; Ser. No. 07/895,985, and now U.S. Pat. No. 5,204,753, for Multi-Bit Rendering Method and Arrangement for Continuous Tone Picture Representation and Printing; Ser. No. 07/895,554, and now U.S. Pat. No. 5,260,807, for a Method and Apparatus For Imbedding Controlled Structure For Gray Scale Rendering; and Ser. No. 07/895,988, and now U.S. Pat. No. 5,258,850, for Line Screen Design for Gray Scale Rendering. Each of these related applications is hereby expressly incorporated by reference into this application.

FIELD OF THE INVENTION

The present invention relates to the field of encoding pictorial imagery for reproduction on display or printing systems, and more particularly, to improving the lightness jumps between steps in gray level halftone printing.

BACKGROUND OF THE INVENTION

In the area of digital printing (the term "printing" is used to encompass both printing and displaying throughout), gray level has been achieved in a number of different manners. The representation of the intensity, i.e., the gray level, of a color by binary displays and printers has been the object of a variety of algorithms. Binary displays and printers are capable of making a mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images contain an apparent continuum of gray levels. As an approximation to continuous tone images, pictorial imagery has been represented via binary halftone technologies. In order to record or display a halftone image with a scanning system, one picture element of the recording or display surface consists of a $j \times k$ matrix of sub-elements where j and k are positive integers. A halftone image is reproduced by printing the respective sub-elements or leaving them blank, in other words, by suitably distributing the printed marks.

Halftone image processing algorithms are evaluated in part, by their capability of delivering a complete gray scale at normal viewing distances. The capability of a particular process to reproduce high frequency rendition (fine detail) with high contrast modulation makes that procedure superior to one which reproduces such fine detail with lesser or no output contrast.

Another method of producing gray levels is provided by gray level printing. In such a method, each pixel has the capability to render several different dot sizes. The dot size for a pixel is a function of the exposure time provided an LED element corresponding to that pixel. The longer the exposure time, the more toner is attracted to that particular pixel. See, for example, U.S. Pat. 4,680,645 for a method of rendering gray scale images with variable dot sizes.

There are two major concerns in rendering a continuous tone image for printing: (1) the resolution of image details, and (2) the reproduction of gray scales. In a binary halftone representation scheme, these two fundamental factors compete with each other. The more gray levels that are rendered, the larger is the halftone cell. Consequently, coarse halftone line screens are provided, with the attendant poor image appearance. Hence, a compromise is made in rendering between the selection of line resolution and gray scales in binary halftone printing. However, in gray level halftone printing, one can satisfy both resolution and gray level requirements. In gray level printing, the same number of addressable dots are present, and there is a choice of dot sizes from one dot-size of 1 bit/pixel to 16 different dot-sizes of 4 bit/pixel. An image could then be rendered with 133 line screens and 128 gray scales of higher quality image. Although providing higher image quality with respect to line resolution and tonal scales, gray level halftoning presents its own dot rendering issues.

Figure 9:
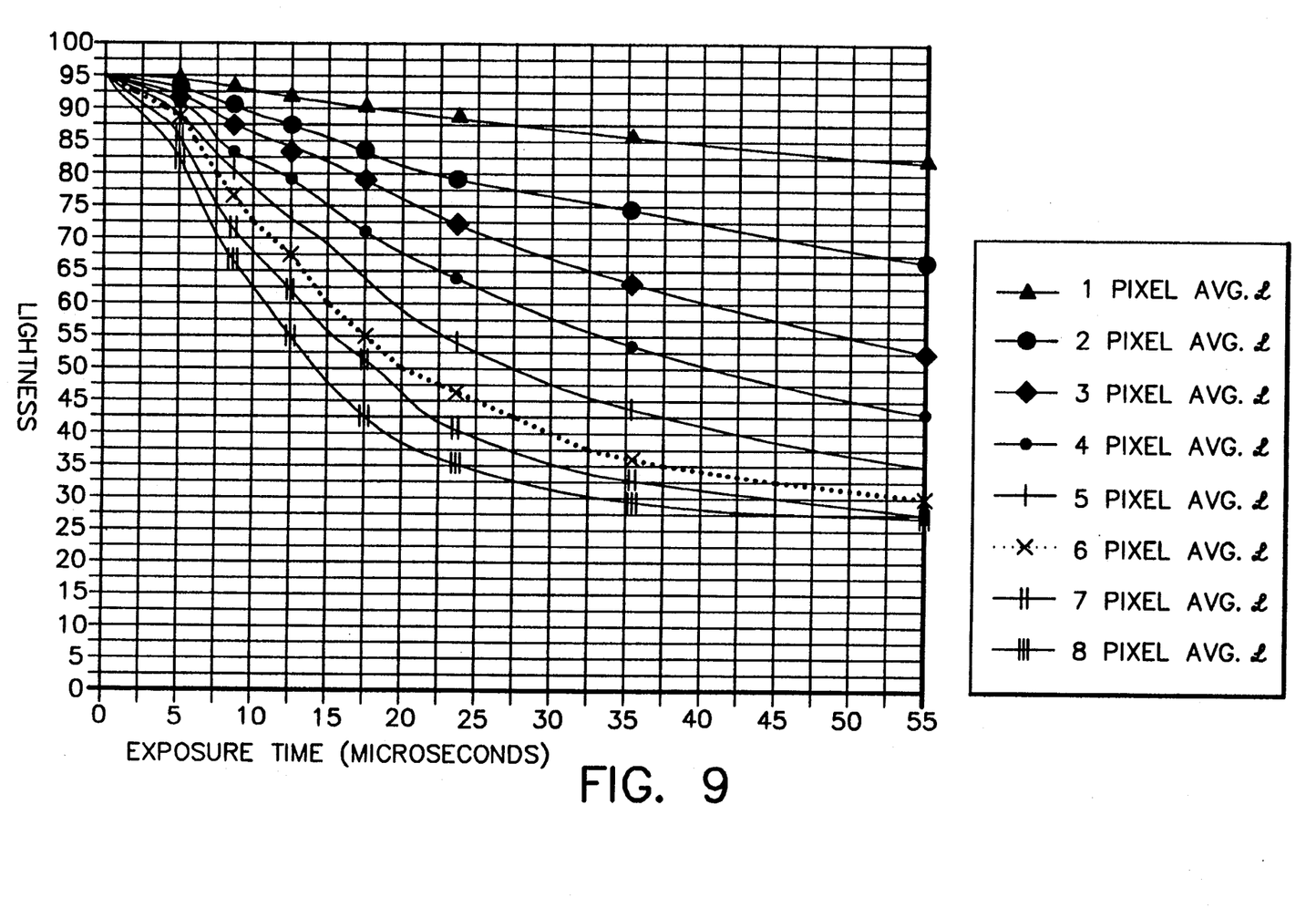
FIG. 9 is a lightness vs. exposure time curve for gray level halftone of one type.

It is desirable to provide an exposure time for the pixels such that there is an equal lightness change between steps in gray level halftone design. An example of a lightness vs. exposure time curve is shown in FIG. 9. This exposure curve is that obtained for continuous tone, which is then normally used for halftone. Such a curve works well for continuous tone output and gray level error diffusion. However, these methods have granularity limitations when the toner particles are relatively large (e.g. 12 microns volume diameter).

In gray level printing the exposure times are associated with different dot sizes. For example, with 3 bits/pixel, there can be 7 different exposure times, and 7 different dot sizes. A problem selecting the 7 exposure times from the continuous tone curve (which gives equal lightness change) can be recognized from FIG. 10, which shows lightness of the overall gray level of a halftone vs. a step number of the halftone, for a mixed dot type halftone cell described later. As can be readily seen, there is a non-even lightness jump in some of the steps. If the unevenness of this lightness jump is too great, noticeable density contouring in the output print will occur.

The reason behind this lightness jump comes from the fact that pixels within a cell grow differently depending on their surroundings, so that the exposure time for a continuous type of system (when all surrounding pixels are on) cannot be simply selected and used for every pixel in a halftone cell in a mixed dot type cell.

There is thus a need for a method and apparatus that reduces contouring by classifying pixels within a cell and modifying the exposure of the pixels according to this classification.

SUMMARY OF THE INVENTION

This and other needs are met by the present invention which provides a method of reproducing an original image, and includes scanning an original image to produce a digitized image, this digitized image containing a plurality of pixels. The pixels are grouped into cells, and the pixels in each cell are classified into one of at least two classes. An exposure level for printing these pixels is modified according to this classification. The pixels are printed according to the modified exposure levels to reproduce the original image.

The earlier stated needs are also met by the present invention which provides an arrangement for reproducing an original image, comprising a scanner which scans and digitizes the original image into pixels, and a controller coupled to the scanner to receive the digitized original image. The controller produces a first signal corresponding to a gray level halftoned representation of the digitized original image. The controller includes means for grouping the pixels into cells, means for classifying the pixels in each cell into one of at least two classes, and means for modifying an exposure level for printing said pixels according to said classification. The arrangement also includes a printer coupled to the controller to receive the first signal having modified exposure levels and produces a gray level halftoned reproduction of the original image.

Other objects, advantages and novel features of the present invention will become apparent from the following detailed description of the invention when considered in conjunction with the accompanying drawings.

DETAILED DESCRIPTION OF THE DRAWINGS

Figures 1, 2:
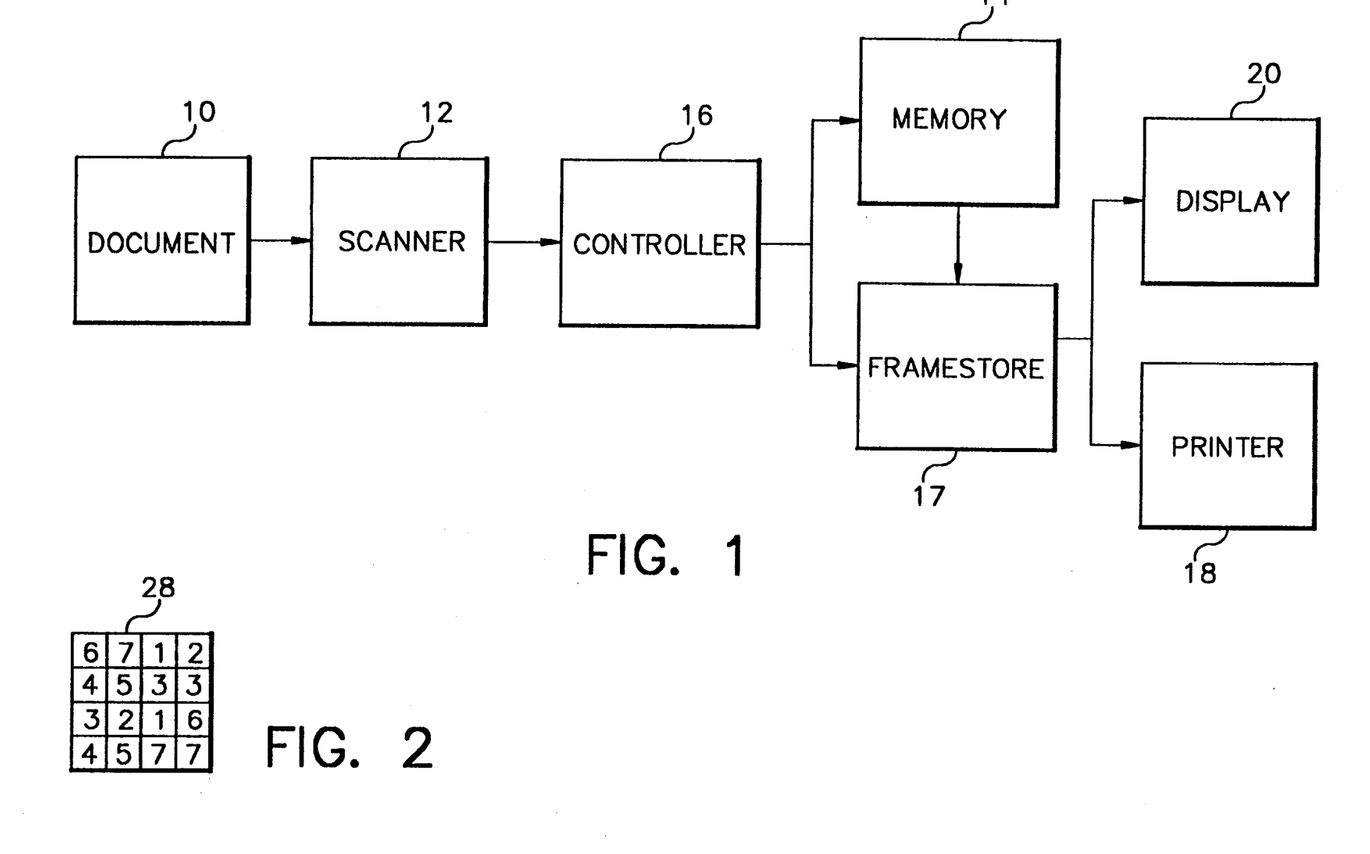
FIG. 1 shows a block diagram of an arrangement for reproducing an image, constructed in accordance with an embodiment of the present invention.
FIG. 2 shows an example of a 4×4 cell with indications of gray level for each pixel.

FIG. 1 illustrates an arrangement which reproduces a document. The document 10 can contain different types of images on the same document. For example, document 10 may contain both text and continuous tone areas, and may also contain halftone areas.

The document 10 is scanned in and digitized by a conventional scanner 12, which operates to provide digital signals representative of the densities of the areas of the document 10 corresponding to a pixel. These signals are sent to a memory (or buffer) 14. Under the direction of a controller 16, these signals may be modified and provided as gray level signals through a framestore 17, to a printer 18 and/or a display 20 for each pixel. The printer 18 and/or display 20 will then reproduce the document 10 by energizing each of the individual pixels according to the gray levels as modified (or not modified) by the controller 16. The memory 14, the controller 16, the framestore 17, the printer 18 and the display 20 are of conventional hardware design.

In gray level printing, each pixel has the capability to render several different dot sizes, and thus different gray levels. However, instead of simply providing each pixel with an independent gray level, several pixels may be organized together to form a super-pixel, or cell. Each of the pixels in a cell is then provided with a gray level. The human visual response integrates the various gray levels of the individual pixels in the cell to a single perceived gray level for the cell. This is similar to the basic concept of binary halftoning. The number of tone scales for a cell is increased greatly, however, due to the number of different gray levels available for each pixel. For example, instead of only the two levels provided in binary halftoning for each pixel, eight levels can be provided with gray level printing for each pixel in a cell (3 bits/pixel). When the cell is made up of 4×4 pixels, for example, the gray level printing allows 121 different gray shades to be rendered for that cell. An example of a 4×4 cell 28 with numbers that represent gray levels for each pixel is shown in FIG. 2.

The formation of the dots in the pixels of a cell can be performed in a number of different manners to achieve different desired results. The dots can be formed as "full" dot, "partial" dot, or "mixed" dot to provide gray level halftoning.

Figure 3:
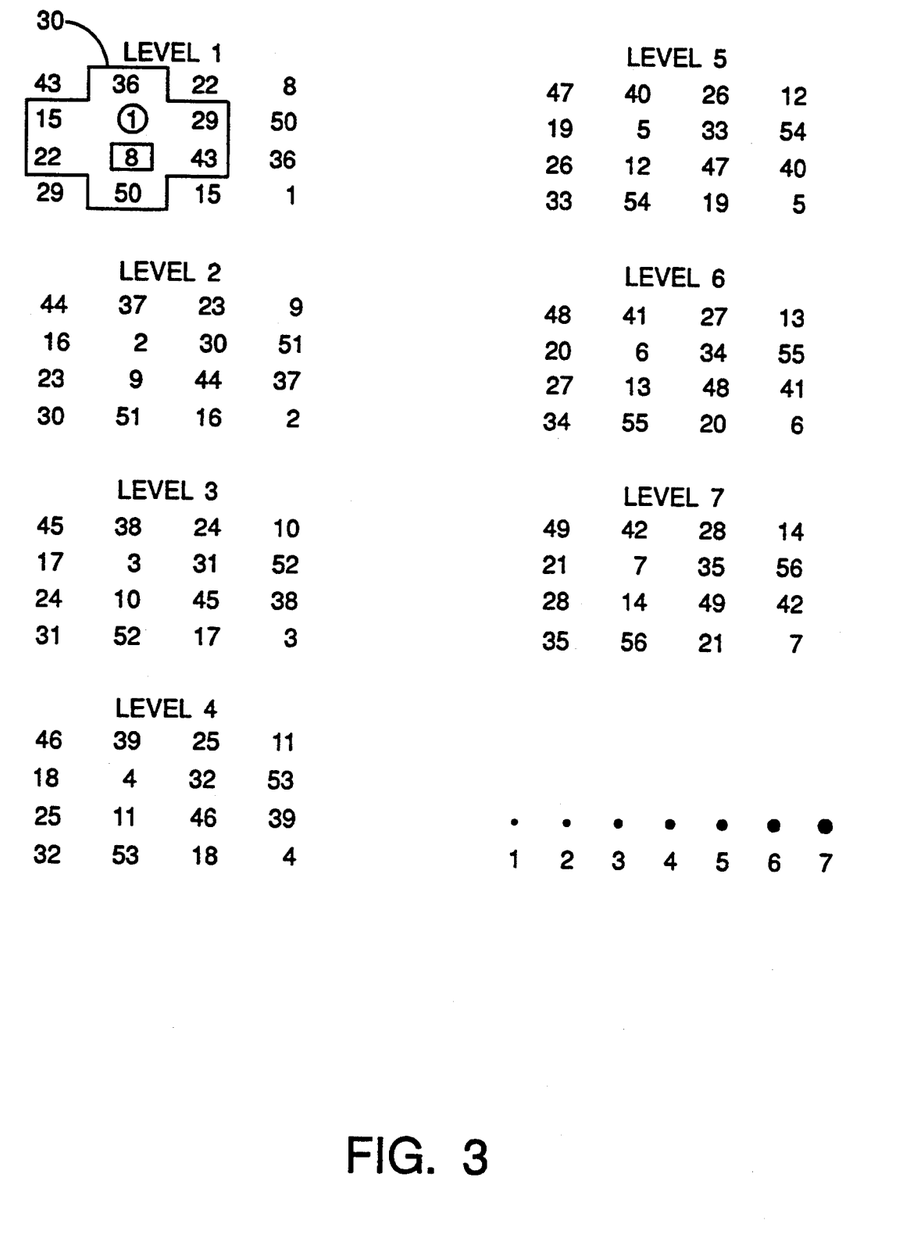
FIG. 3 illustrates an exemplary 3-bit gray halftone dot layout according to a full dot type embodiment of the present invention.

FIG. 3 illustrates an example of a 3-bit gray halftone dot layout for a full dot type formation. Also illustrated are seven different pixel-dot sizes, corresponding to the sizes that each individual pixel-dot can obtain. There are 57 possible gray levels for the exemplary eight element cell 30 shown here. An example of the formation of a cell that is at gray level 12 will now be given.

The pixel circled in level 1, reference numeral 1, is formed to dot-size 1 in level 1. (Only one cell will be described, although the pixels of other cells will be changed according to the same layout, as shown in FIG. 3). The dot at this pixel grows larger and larger as the levels increase from level 1 to level 2 all the way to level 7. One can see that this circled pixel increases in value from 1 to 7 as the levels increase. If the desired gray level for the cell 30 was 7, then the formation of dots would be completed once the circled pixel has reached the dot-size of 7 in level 7. In this example, however, the gray level for the cell 30 is desired to be 12. At gray level 7, the circled pixel has reached its maximum dot-size, so that a dot at another pixel must now start forming. This dot starts forming at the pixel indicated with a square around it in level 1, with the numeral 8.

Figure 4:
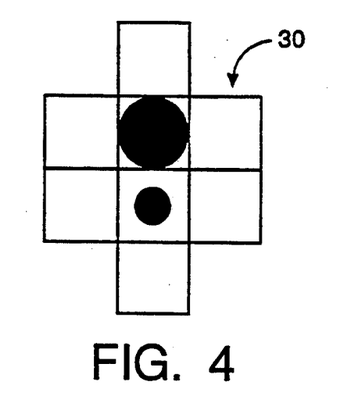
FIG. 4 shows a cell with dots that have been formed.

The dot formation process continues, with the dot at this second pixel growing larger and larger as the levels again increase from level 1 to level 5. The formation process stops at level 5, since the pixel has now reached the value of 12. The halftone cell 30 now contains, as seen in FIG. 4, a dot of dot-size 7, and a dot of dot-size 5. The extension of this formation process to 57 gray levels is easy to see from this example.

Figure 5:
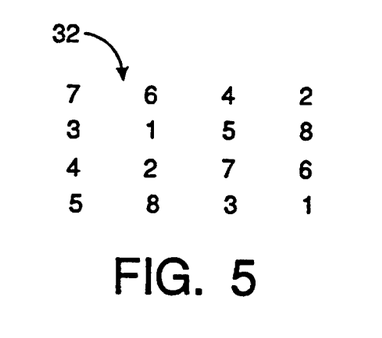
FIG. 5 illustrates an exemplary halftone dot mask.

The full dot type process thus involves forming dots at the highest priority pixels to their maximum allowable dot-size before beginning the formation of the dots at the next highest priority pixels. An exemplary halftone dot mask 32 with pixel priorities indicated is shown in FIG. 5. Different matrix sizes, cell shapes and priorities can be used for the cells than that illustrated in FIG. 3, without departing from the spirit and scope of the present invention.

In the electrophotographic process, the full dot type formation process is favored because it forms stable dots and exhibits less granularity (halftone printing noise). Another method which carries more information detail than full dot, but at the cost of less stable dots, is the partial dot type, described below.

Figure 6:
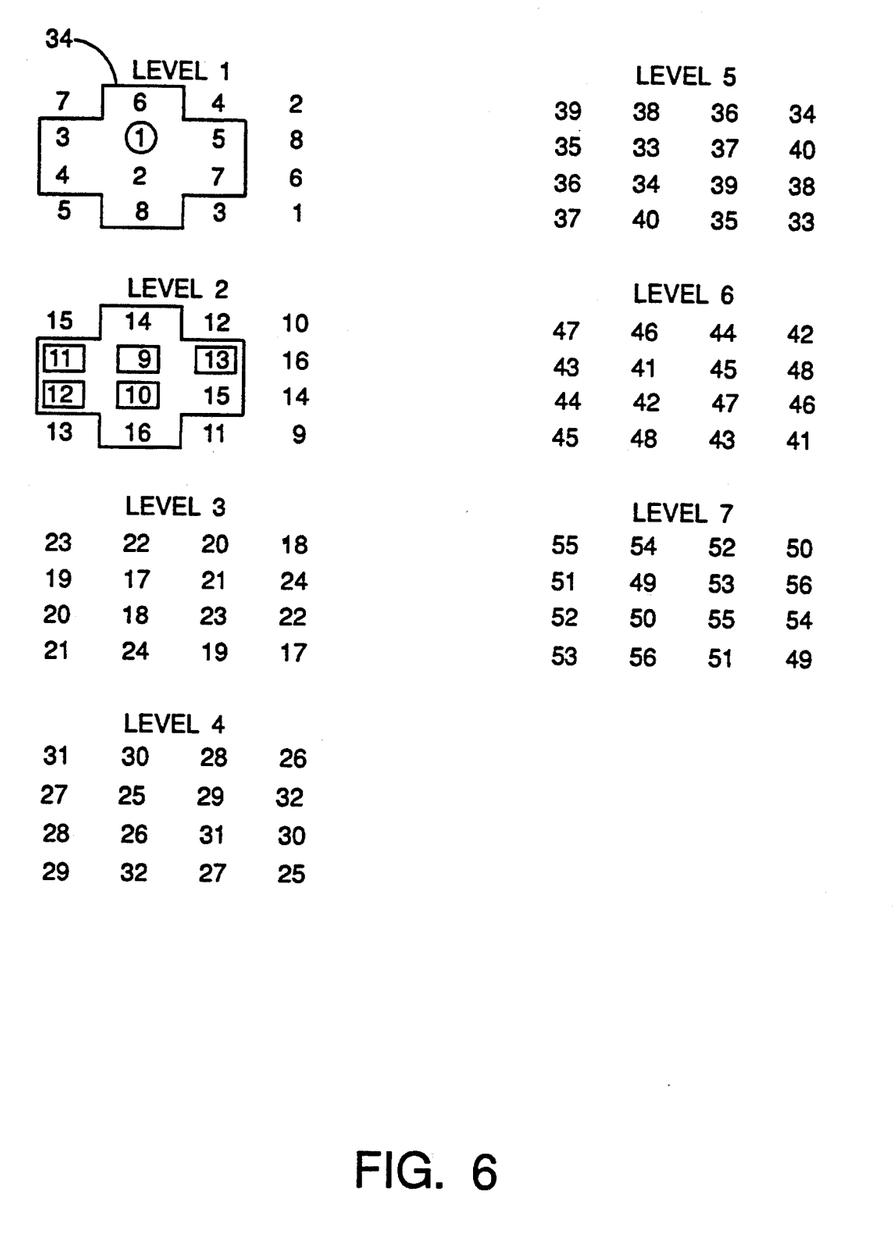
FIG. 6 shows a 3-bit gray halftone dot layout according to a partial dot type embodiment of the present invention.

A 3-bit gray halftone dot layout for the partial dot type formation process is shown in FIG. 6. In this process, the cell 34 is built by providing a dot of the same size to each pixel in the cell to the extent possible, before building up the dot at any particular pixel to the next larger size. Thus, for a gray level of 6 for the cell 34, the circled pixel in level 1 would have a dot formed at that pixel with a dot-size of 1. For larger gray levels, for example gray level 13, each of the pixels in the cell 34 would be built up to at least dot-size of 1. The pixels indicated with a square around them in level 2 would be built up to have a dot-size of 2.

The partial dot formation process can thus be seen to spread out the information over the cell, and therefore carries more information detail than the full dot. It does suffer from less stable dots and more granularity, however.

The mixed dot type, discussed below, combines the merits of both the full dot and the partial dot types in gray level halftoning. A number of different processes can be provided to combine the full dot type and the partial dot type, with the specific mixed dot type being chosen based on which renders an image with more smoothness, less graininess, and more image details. Suggested strategies are: 1) build small stable dots in the highlight (toe) region; 2) keep tone response linear in the mid-tone region; 3) reduce dot structure in the shadow (shoulder) region and render more details. Based on these considerations, a specific mixed dot type can be chosen by one of ordinary skill in the art to optimize stable dots, more image detail and less graininess.

Figure 7:
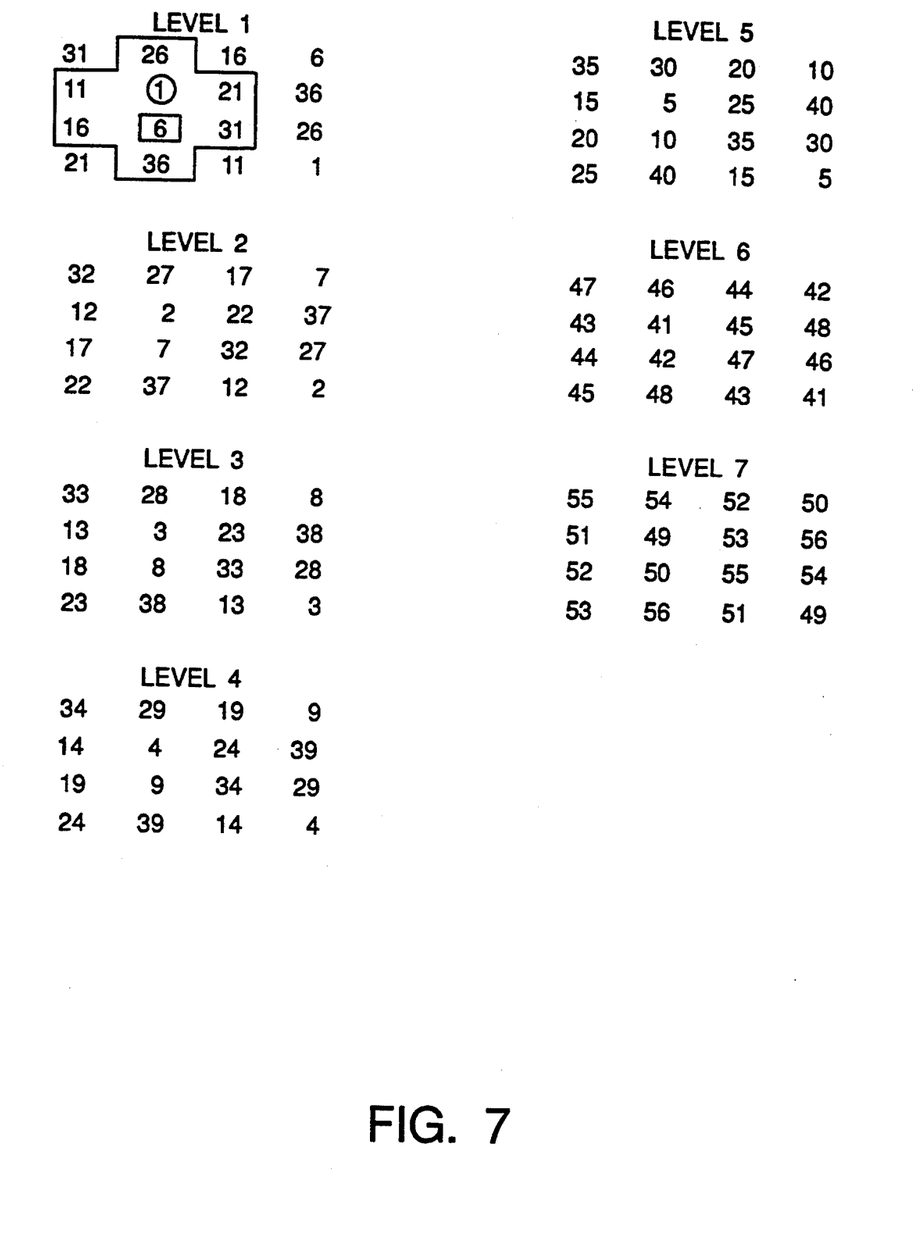
FIG. 7 shows a 3-bit gray halftone dot layout according to a mixed dot type embodiment of the present invention.

An example of a specific mixed dot type 3-bit gray halftone dot layout is illustrated in FIG. 7. As can be seen, until gray level 41 is reached, the pixels are constrained from growing beyond dot-size of 5. The pixels grow in a full dot type process, with the pixel circled growing to a dot-size of 5, with the pixel that is squared then starting to grow in size. Once all of the pixels in the cell have attained a dot-size of 5, corresponding to gray level 40, the cell then increases in gray level by using a partial dot type process. In other words, each of the pixels in the cell must grow to a dot-size of 6 before any of the pixels begins growing to a dot-size of 7.

Figure 8:
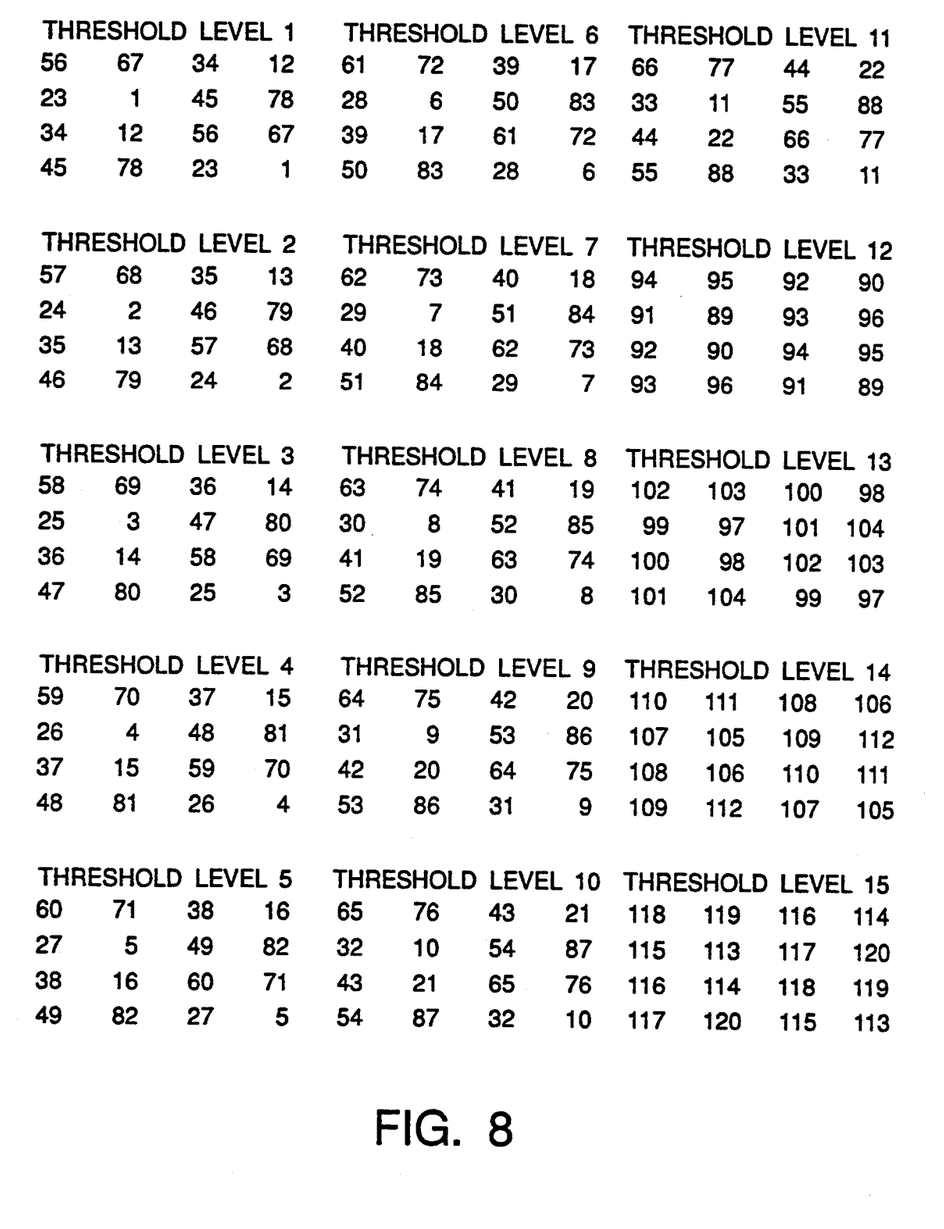
FIG. 8 shows a 4-bit gray halftone dot layout according to a mixed dot type embodiment of the present invention.

An example of a 4-bit gray halftone dot layout for mixed dot type is illustrated in FIG. 8. The formation of the dots is the same in concept to that illustrated in FIG. 7. Because there are 15 dot sizes available for each pixel, 121 gray levels for an eight element cell are obtainable.

Experimentally, the inventor of the present invention found that if it is assumed that:

$R = R_p + A_D \{f(t) - R_p\}$, where $R_p$ is the reflectance of the paper base, $A_D$ is the toned dot area/unit area and $f(t)$ is the reflectance of the toned area as a function of exposure time (t) for a continuous tone patch and R is the reflectance of the halftone patch, then for more than 5 pixels in a cell that are turned on, $A_D$ approaches 1 (the continuous tone case). This assumption is true only for a mixed dot of a specified type of 141/inch screen (at 45 degree angle) with a 400 dpi system. If the number of pixels with a cell (one cell has 8 pixels in this case) that are turned on is less than 5, then $A_D < 1$ and $A_D$ increases from 0 to 1 with respect to a function that is related to the perimeter of the dot/unit area.

Figure 10:
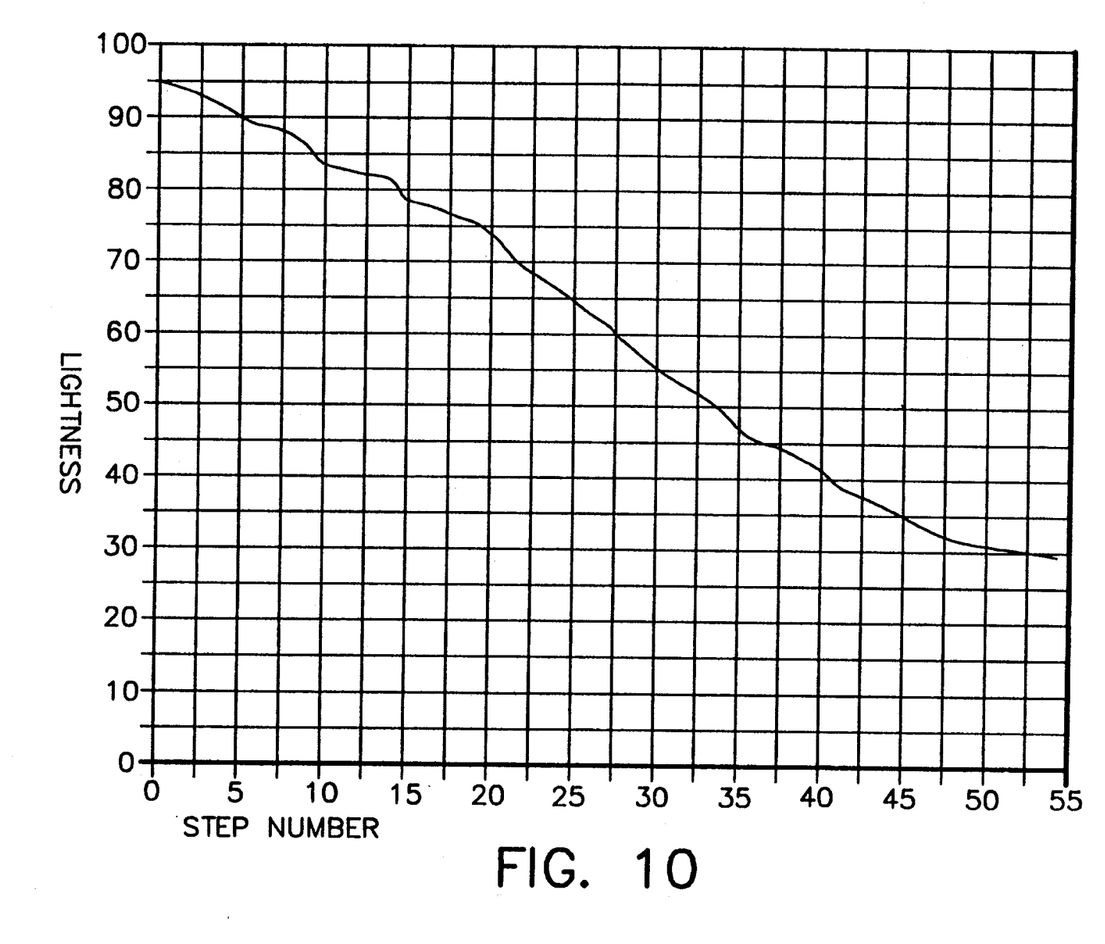
FIG. 10 is a lightness vs. exposure time curve for gray level halftone of a different type.

This indicates that with a lower number of pixels turned on in a cell, $A_D$ (the dot area) increases and $f(t)$, which is related to the density within a pixel, decreases as a function of exposure t. If the number of pixels within a cell that is supposed to be turned on in a gray level mixed dot is more than 5, then the halftone behaves like a continuous tone system. In other words, $A_D = 1$ and R almost follows the predicted curve of $f(t)$ for a continuous tone system (see FIG. 9). However, when using a mixed dot type, the lightness vs. exposure time curve exhibits non-even lightness jump in some steps (FIG. 10). If the unevenness of the lightness jump is too much, this is noticed in contouring. Accordingly the present invention uses a different set of exposure times (in each gray level) for pixels that are isolated in a cell (a "low density region") than those pixels that are grouped together with other pixels in a cell (a "high density region").

The printhead of the printer 18 may be a 6 bits/pixel gray level printhead. This may provide 40 uniformly corrected gray levels per pixel. In the present invention, only 3 bits or 4 bits per pixel are used so as to provide a device independent approach in printing. By using the halftone structural information, it is possible to produce a more even lightness jump between steps.

Figures 11, 12:
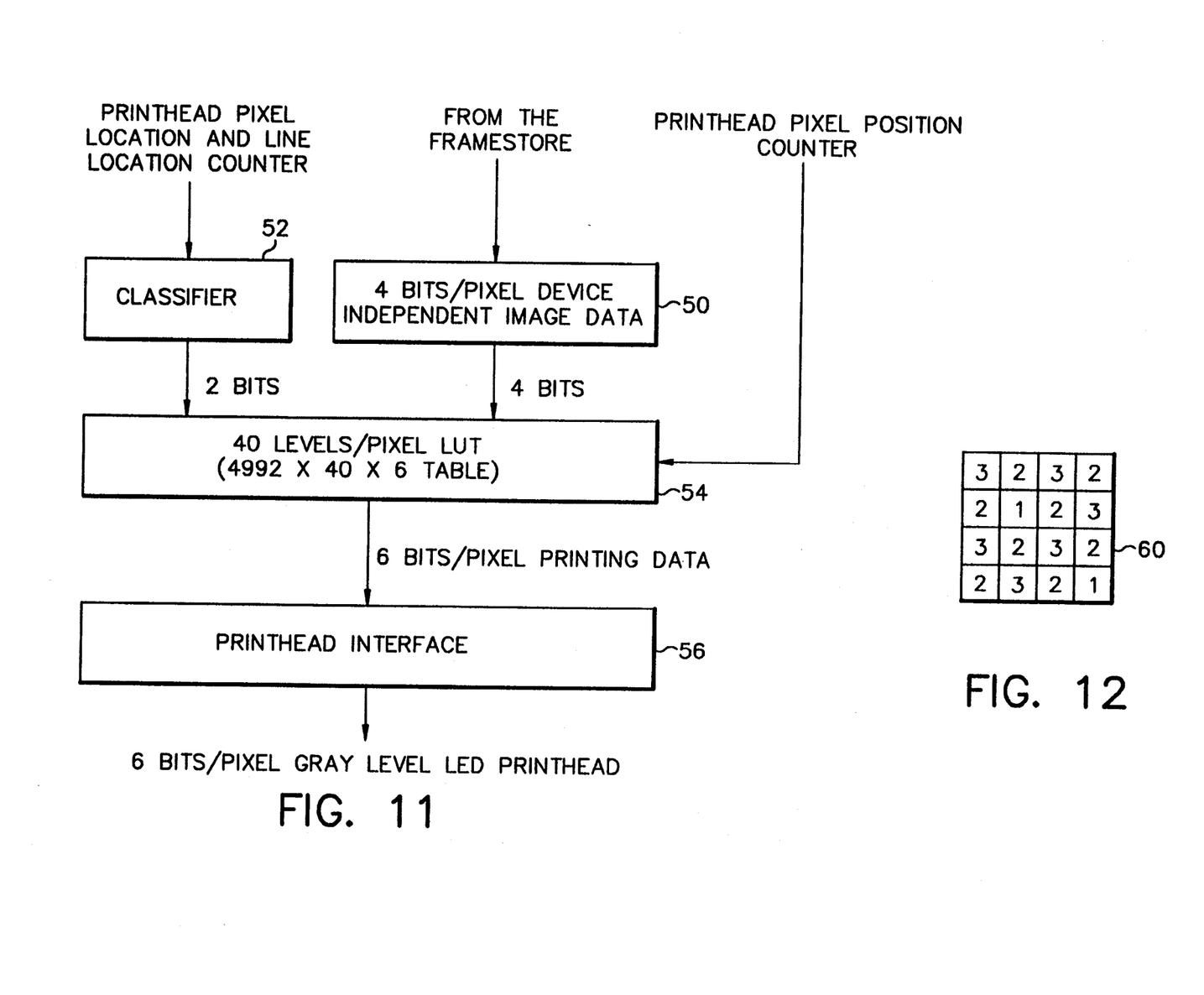
FIG. 11 is a block diagram of a method for modifying gray levels using a classifier according to an embodiment of the present invention.
FIG. 12 illustrates an example of a 4×4 classifier.

FIG. 11 illustrates a flow chart for converting the device independent 4-bits/pixel image data to 6 bits/pixel gray level data. In addition to the 4 bit/pixel image data received from the frame store 17 in step 50, the printer 18 receives 2-bit classification information that identifies which pixel location and line location inside a halftone cell is being addressed. This information is generated by a classifier in step 52 which essentially indicates whether the pixel is in the center of a cell or on the periphery of the cell by the generation of a 2-bit sub-address.

The 2-bit sub-address containing structural information is combined with the 4-bits of image information to act as an address for a 40 levels/pixel look up table (LUT). The printhead pixel location in the line is provided to address which one of the 4992 pixels in a full wide printhead for which the pixel is supposed to extract the 40 levels of information. The output from the LUT is 6 bits/pixel printer information that is sent to the printhead in step 56. Although the above description assumes that the classification and the LUT are resident on the printer 18, it should be apparent to one of ordinary skill in the art that this process can also be performed by the controller 16.

Figure 13:
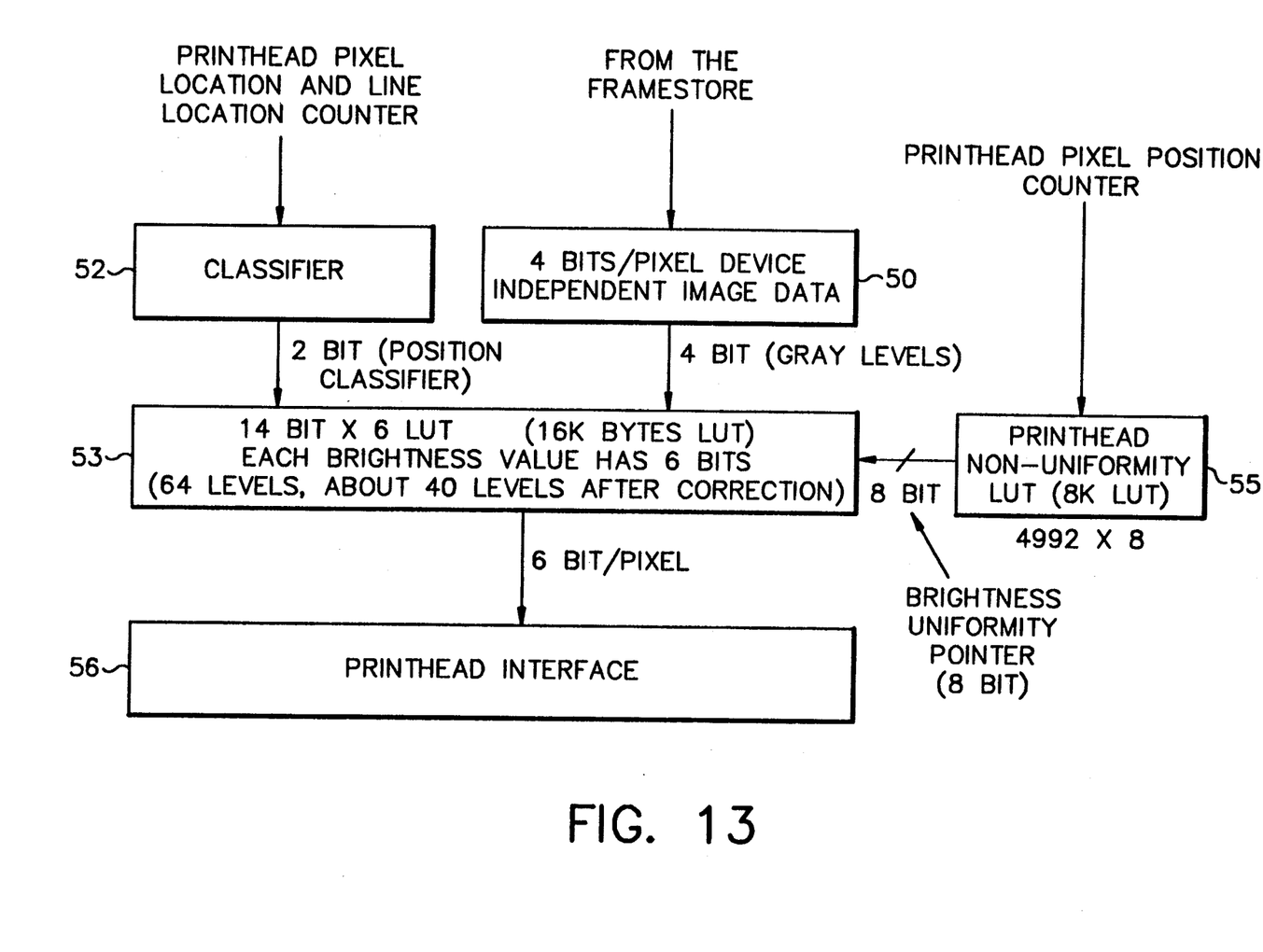
FIG. 13 is a block diagram showing an alternative embodiment of the method for modifying gray levels using a classifier.

FIG. 13 illustrates another embodiment of the method of the present invention. Instead of using the single LUT 54 of FIG. 11, two LUT's are used. The first LUT 55 is a non-uniformity brightness LUT (8K bytes). The second LUT 53 is a 14-bit address LUT that provides the correct exposure for each pixel when provided with gray value input and position classifier input. The non-uniformity LUT 55 can be an 8K byte SRAM, for example.

The brightness of the LED pixels is sorted into 256 "bins" so that a better usage of the non-uniformity range of an LED is used. The pixel counter points to each individual pixel which then outputs its brightness bin (1 of 256). This eight-bit brightness bin acts as an index pointer to the 14-bit LUT 53, which can be a 14-bit×8 SRAM~16K bytes LUT. The 14-bit LUT 53 has the rest of the LUT address (6 bits) from the 4-bit gray levels input and the 2-bit position classifier. Although there are theoretically 64 levels for each pixel, due to the non-uniformity of the printhead, there are only approximately 40 real levels that exist after non-uniformity correction for some pixels.

An example of a classifier is shown in FIG. 12, which illustrates a 4×4 classifier 60. In this example, there are 3 designated classes of pixels within a cell. The first class is a pixel within the center of a cell (1). The second class are those pixels which surround the center pixel (2). The third class are those pixels which may overlap pixels in the surrounding halftone dots (3). The 2-bit sub-address provides information sufficient for three classifications.

Class 3 pixels are essentially very much like continuous tone, so that one can use the exposure times for the continuous tone curve for exposure (the 8 pixels curve) that was illustrated in FIG. 9. For the single pixel of class 1, it is better to use a higher exposure time, such as the 1 pixel curve of FIG. 9, to achieve the same lightness change. For the pixels of class 2, the effect is made more intermediate, near the 4 pixels curve of FIG. 9. These exposure values are stored in the LUT, so that once the pixel location in a halftone cell is classified by the classifier, a different exposure level is provided by the LUT to achieve a more even halftone lightness jump.

As an example, for a pixel of class 1, the exposure level may be (a). If the pixel next to the first one is class 2, and would have an exposure level of (a) if standing alone, this second pixel of class 2 will be assigned an exposure level of (b) to achieve an equivalent change in lightness in the halftone. When all the pixels in a cell have been classified and provided with an exposure level based on that classification within a cell, there will be 16 equivalent gray level outputs per pixel irrespective of the pixel location in the gray level halftone cell. These 16 equivalent gray levels have been provided from the 40 available levels after the correction for the location of the pixel in the cell.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of reproducing an original image, comprising:
    scanning an original image to produce a digitized image, said digitized image containing a plurality of pixels having different grey level values;
    grouping the pixels into cells;
    comparing grey level values for the pixels with sets of thresholding values and in response to said comparing generating a multibits per pixel device independent image data signal;
    classifying the pixels in each cell into one of at least two classes wherein the step of classifying includes classifying the pixels of a cell into a first class which includes a central pixel of the cell, and a second class which includes pixels which surround the central pixel;
    generating exposure level signals for printing said pixels according to said classification and said device independent image data signal; and
    printing said pixels according to said exposure level signals to reproduce the original image.

2. The method of claim 1 and wherein said sets of threshold values represent mixed dot threshold matrix values.

3. The method of claim 2, wherein the step of classifying includes classifying the pixels of the cell into a third class which includes pixels which may overlap pixels in surrounding cells.

4. The method of claim 3, wherein for pixels having the same device independent image data signal and for recording by the same recording element the pixels of the first class have a higher exposure time, the pixels of the second class have an intermediate exposure time, and the pixels of the third class have a lesser exposure time.

5. The method of claim 3, wherein the step of generating exposure level signals includes receiving at inputs of a look up table (LUT) device independent image dam relating to exposure of a pixel of a cell, and said classifying signal for that pixel, said LUT providing a modified exposure level for that pixel.

6. An apparatus for reproducing an original image, comprising:
    a scanner which scans and digitizes the original image into pixels;
    a controller coupled to the scanner to receive the digitized original image, and which produces a first signal corresponding to a gray level halftoned representation of the digitized original image, the controller including means for grouping the pixels into cells, means for comparing grey level values of the digitized original image with sets of thresholding values and in response to said comparing generating a multibits per pixel device independent image data signal, means for classifying the pixels in each cell into one of at least two classes the means for classifying classifies the pixels of a cell into a first class which includes a central pixel of the cell, and a second class which includes pixels which surround the central pixel, and means for generating exposure level signals for printing said pixels according to said classification and said device independent image data signal; and
    a printer coupled to the controller to receive said first signal having modified exposure levels and which produces a gray level halftoned reproduction of the original image.

7. The apparatus of claim 6 wherein said sets of threshold values represent mixed dot threshold matrix values.

8. The apparatus of claim 7, wherein the means for classifying includes means for classifying the pixels of the cell into a third class which includes pixels which may overlap pixels in surrounding cells.

9. The apparatus of claim 8, wherein for pixels having the same device independent image data signal and for recording by the same recording element the pixels of the first class have a higher exposure time, the pixels of the second class have an intermediate exposure time, and the pixels of the third class have a lesser exposure time.

10. The apparatus of claim 7, wherein the means for generating exposure level signals includes a look up table (LUT) device which receives at its input device independent image data relating to exposure of a pixel of a cell, and said classifying signal for that pixel, said LUT providing a modified exposure level for that pixel.

11. The apparatus of claim 6, wherein the means for generating exposure level signals includes first and second look up tables (LUT's), the first LUT being a nonuniformity LUT that receives printhead pixel position counter information and produces a brightness uniformity pointer, the second LUT receiving as inputs the brightness uniformity pointer, device independent image data relating to exposure of a pixel of a cell, and the classifying signal for that pixel, the second LUT producing a modified exposure level for that pixel.

* * * * *